United States Patent
Wang (10) Patent No.: US 11,218,678 B2
(45) Date of Patent: Jan. 4, 2022

(54) PROJECTION SYSTEM, PROTECTION CIRCUIT AND CURRENT MONITORING METHOD OF IMAGE RESOLUTION ENHANCEMENT DEVICE

(71) Applicant: Coretronic Corporation, Hsin-Chu (TW)

(72) Inventor: Chao-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/708,174

(22) Filed: Dec. 9, 2019

(65) Prior Publication Data

US 2020/0186770 A1 Jun. 11, 2020

(30) Foreign Application Priority Data

Dec. 11, 2018 (CN) .......................... 201811511881.8

(51) Int. Cl.
*G06F 3/038* (2013.01)
*G09G 5/00* (2006.01)
*H04N 9/31* (2006.01)

(52) U.S. Cl.
CPC .......... *H04N 9/3197* (2013.01); *H04N 9/312* (2013.01); *H04N 9/3155* (2013.01)

(58) Field of Classification Search
CPC .... H04N 9/3197; H04N 9/312; H04N 9/3155; H04N 9/3188; H04N 9/317
See application file for complete search history.

(56) References Cited

U.S. PATENT DOCUMENTS

| | | | | | |
|---|---|---|---|---|---|
| 5,561,285 | A | * | 10/1996 | Sakata | ............... G06K 15/1214 250/205 |
| 7,221,343 | B2 | * | 5/2007 | Kageyama | ........... G09G 3/3233 345/82 |

(Continued)

FOREIGN PATENT DOCUMENTS

| | | |
|---|---|---|
| CN | 105849619 | 8/2016 |
| CN | 106230244 | 12/2016 |

(Continued)

OTHER PUBLICATIONS

"Office Action of China Counterpart Application", dated Jun. 2, 2021, p. 1-p. 12.

*Primary Examiner* — Insa Sadio
(74) *Attorney, Agent, or Firm* — JCIPRNET (57) ABSTRACT

A projection system, a protection circuit and a current monitoring method of an image resolution enhancement device are provided. A light valve converts an illumination beam into an image beam. The image resolution enhancement device changes a transmission path of the image beam according to a driving current. The protection circuit detects the driving current. When the driving current is greater than or equal to a first current threshold, the protection circuit further compares the driving current with a second current threshold. When a duration time that the driving current is smaller than the second current threshold and greater than or equal to the first current threshold is greater than or equal to a time threshold, the protection circuit decreases the driving current to be smaller than the first current threshold to control the image resolution enhancement device. The projection lens converts the image beam into a projection beam.

11 Claims, 5 Drawing Sheets

(56) References Cited

U.S. PATENT DOCUMENTS

| | | | |
|---|---|---|---|
| 2007/0189345 A1* | 8/2007 | Ko | H01S 5/06832 372/29.021 |
| 2008/0068002 A1* | 3/2008 | Takeuchi | H04N 9/3155 324/76.79 |
| 2008/0165815 A1* | 7/2008 | Kamijima | H04N 9/3129 372/34 |
| 2011/0181791 A1* | 7/2011 | Huang | H04N 9/3155 348/744 |
| 2013/0069928 A1* | 3/2013 | Mizusako | G09G 3/3614 345/212 |
| 2014/0079080 A1* | 3/2014 | Nishioka | H01S 3/102 372/9 |
| 2014/0125873 A1* | 5/2014 | Nakamura | H04N 9/3135 348/771 |
| 2014/0253527 A1* | 9/2014 | Ogi | G09G 5/02 345/207 |
| 2015/0161926 A1* | 6/2015 | Ogi | H04N 9/3129 345/207 |
| 2015/0260984 A1* | 9/2015 | Yamakawa | H04N 9/3182 345/591 |
| 2017/0208298 A1* | 7/2017 | Nobori | H04N 9/3194 |
| 2017/0208306 A1* | 7/2017 | Takahashi | G03B 21/2053 |
| 2017/0277031 A1* | 9/2017 | Miyakawa | G02B 26/0833 |
| 2017/0289510 A1* | 10/2017 | Fukui | H04N 9/3155 |
| 2018/0288377 A1* | 10/2018 | Furuya | H04N 9/3155 |
| 2019/0037183 A1* | 1/2019 | Xu | G02B 27/1006 |

FOREIGN PATENT DOCUMENTS

| | | |
|---|---|---|
| CN | 107181239 | 9/2017 |
| TW | 201233042 | 8/2012 |
| TW | 625929 | 6/2018 |

\* cited by examiner

PROJECTION SYSTEM, PROTECTION CIRCUIT AND CURRENT MONITORING METHOD OF IMAGE RESOLUTION ENHANCEMENT DEVICE

CROSS-REFERENCE TO RELATED APPLICATION

This application claims the priority benefit of China application serial no. 201811511881.8, filed on Dec. 11, 2018. The entirety of the above-mentioned patent application is hereby incorporated by reference herein and made a part of this specification.

BACKGROUND

Technical Field

The invention relates to a protection technique, and particularly relates to a projection system, a protection circuit and a current monitoring method of an image resolution enhancement device.

Description of Related Art

Along with the development of technology, various projection systems have been widely used in various occasions. In order to provide a better projection effect, the projection systems probably use actuators to control positions of some elements. Generally, the operation of the actuator is controlled by an input driving current. However, sometimes the driving current is too high to result in component damage in the projection system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection system, a protection circuit and a current monitoring method of an image resolution enhancement device, wherein the image resolution enhancement device in the projection system is protected to avoid a problem caused by an excessively high driving current.

Other objects and advantages of the invention may be further illustrated by the technical features broadly embodied and described as follows.

In order to achieve one or a portion of or all of the objects or other objects, an embodiment of the invention provides a projection system. The projection system includes an illumination module, a light valve, an image resolution enhancement device, a protection circuit and a projection lens. The illumination module is configured to emit an illumination beam. The light valve is disposed on a transmission path of the illumination beam and is configured to convert the illumination beam into an image beam. The image resolution enhancement device is disposed on a transmission path of the image beam and changes the transmission path of the image beam according to a driving current. The protection circuit is electrically connected to the image resolution enhancement device and is configured to detect the driving current. When the driving current is greater than or equal to a first current threshold, the protection circuit further compares the driving current with a second current threshold, wherein the second current threshold is greater than the first current threshold. When a duration time that the driving current is smaller than the second current threshold and the driving current is greater than or equal to the first current threshold is greater than or equal to a time threshold, the protection circuit decreases the driving current to be smaller than the first current threshold to control the image resolution enhancement device. The projection lens is disposed on the transmission path of the image beam and converts the image beam into a projection beam.

In order to achieve one or a portion of or all of the objects or other objects, an embodiment of the invention provides a protection circuit of an image resolution enhancement device. The image resolution enhancement device receives a driving current to change a transmission path of an image beam, and the protection circuit includes a sensing circuit, a comparison circuit, a time monitoring circuit, and a control circuit. The sensing circuit is electrically connected to an input terminal of the image resolution enhancement device and configured to monitor the driving current of the input terminal. The comparison circuit is electrically connected to the sensing circuit and configured to compare the driving current with a first current threshold and a second current threshold to output a comparison result, wherein the second current threshold is greater than the first current threshold. The time monitoring circuit is electrically connected to an output terminal of the comparison circuit, and configured to count a duration time when the driving current is greater than or equal to the first current threshold but smaller than the second current threshold, and continuously determines whether the duration time is greater than or equal to a time threshold. The control circuit is electrically connected to the comparison circuit and the time monitoring circuit and configured to adjust the driving current to control the image resolution enhancement device according to the comparison result and an output result of the time monitoring circuit.

In order to achieve one or a portion of or all of the objects or other objects, an embodiment of the invention provides a current monitoring method of an image resolution enhancement device. The image resolution enhancement device receives a driving current to change a transmission path of an image beam, and the current monitoring method includes: detecting the driving current; comparing the driving current with a first current threshold; further comparing the driving current with a second current threshold when the driving current is greater than or equal to the first current threshold, wherein the second current threshold is greater than the first current threshold; starting counting a duration time when the driving current is greater than or equal to the first current threshold but smaller than the second current threshold; and decreasing the driving current to be smaller than the first current threshold to control the image resolution enhancement device when the duration time is greater than or equal to a time threshold.

According to the above description, the embodiments of the invention have at least one of the following advantages or effects. The protection circuit and the current monitoring method of the image resolution enhancement device are capable of protecting the image resolution enhancement device in the projection system, so as to avoid the problem of component damage caused by the excessively large driving current of the image resolution enhancement device.

During the projection process of the projection system, the driving current is continuously monitored to maintain the stableness of the projection system.

Other objectives, features, and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Figure 1:
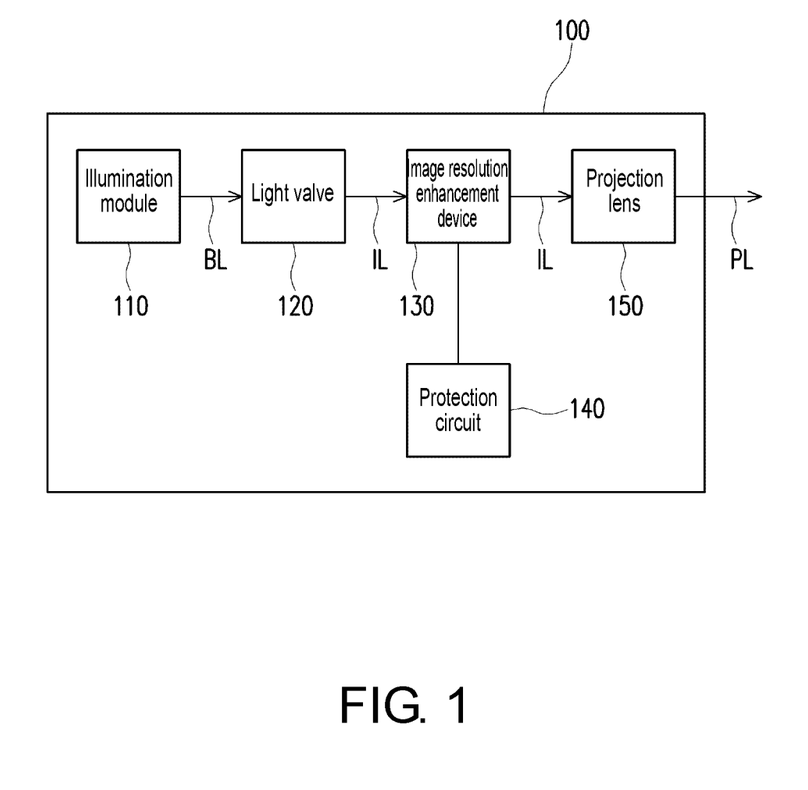
FIG. 1 is a schematic diagram of a projection system according to an embodiment of the invention.
Figure 2:
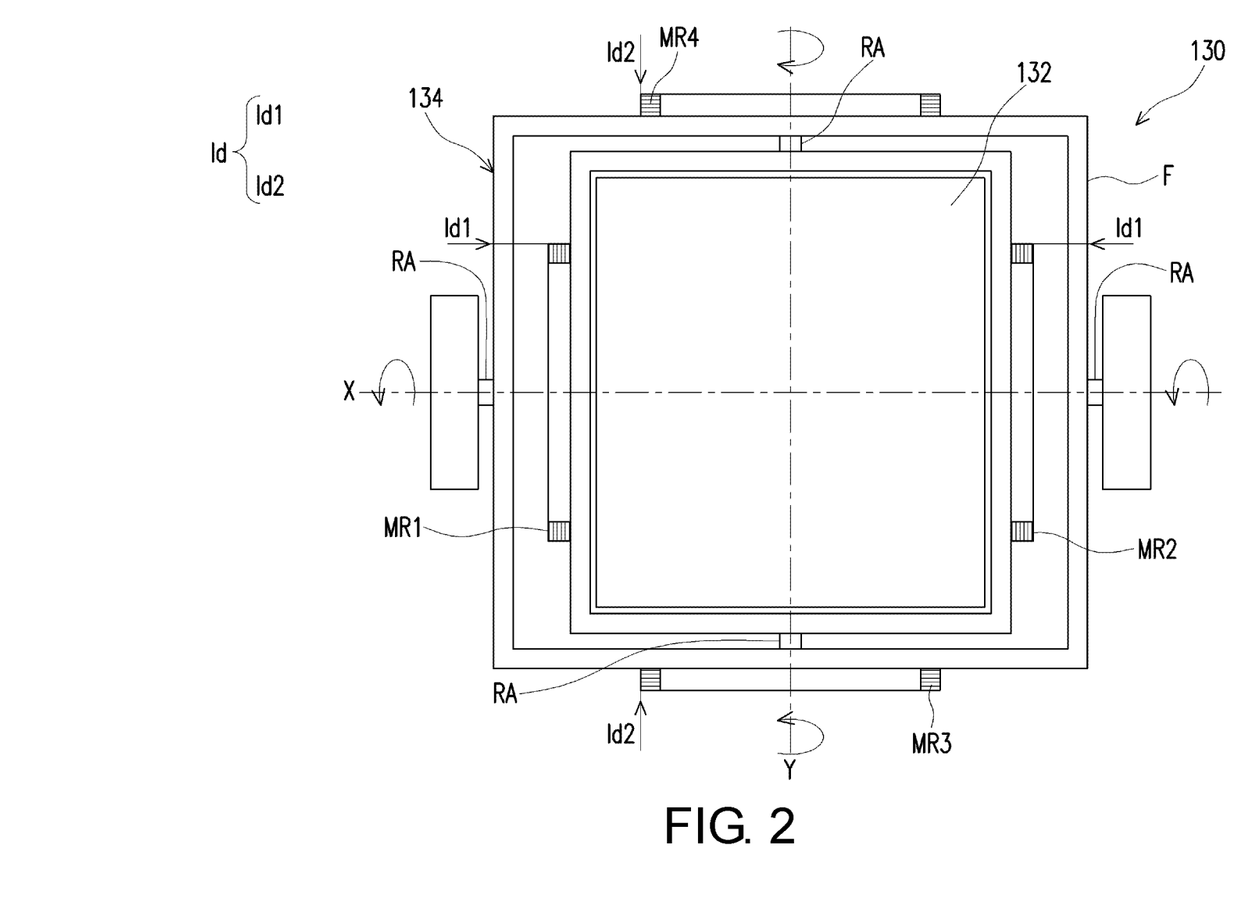
FIG. 2 is a schematic diagram of an image resolution enhancement device according to an embodiment of the invention.

FIG. 1 is a schematic diagram of a projection system according to an embodiment of the invention, and FIG. 2 is a schematic diagram of an image resolution enhancement device according to an embodiment of the invention. The image resolution enhancement device of FIG. 2 is adapted to the embodiment of FIG. 1. Referring to FIG. 1 and FIG. 2, the projection system 100 includes an illumination module 110, a light valve 120, an image resolution enhancement device 130, a protection circuit 140, and a projection lens 150. The illumination module 110 is configured to emit an illumination beam BL. The light valve 120 is disposed on a transmission path of the illumination beam BL, and is configured to convert the illumination beam BL into an image beam IL. The image resolution enhancement device 130 is disposed on a transmission path of the image beam IL, and configured to change the transmission path of the image beam IL according to a driving current Id.

The image resolution enhancement device 130 includes an optical relay unit 132 and an actuator 134. The actuator 134 may control the optical relay unit 132 according to the input driving current Id, for example, a driving current Id1 or Id2 shown in FIG. 2. The protection circuit 140 is electrically connected to the image resolution enhancement device 130, and is configured to monitor the driving current Id. When the driving current Id is greater than or equal to a first current threshold, the protection circuit 140 further compares the driving current Id with a second current threshold, wherein the second current threshold is greater than the first current threshold. When the driving current Id is greater than or equal to the second current threshold, the protection circuit 140 stops providing the driving current Id to the image resolution enhancement device 130. When the driving current Id is smaller than the second current threshold but greater than or equal to the first current threshold, and a duration time thereof is greater than or equal to a time threshold, the protection circuit 140 decreases the driving current Id to be smaller than the first current threshold to control the image resolution enhancement device 130. The projection lens 150 is disposed on the transmission path of the image beam IL, and is configured to convert the image beam IL into a projection beam PL. The projection system 100 projects the projection beam PL onto a screen according to an image signal so as to provide an image of the image signal for the audience to watch.

Further, the image resolution enhancement device 130 may sequentially change the direction of the image beam IL within a short time (for example, within a frame period), such that the image beam IL is transmitted along different paths. In an embodiment, the image beam IL passes through the projection lens 150 along different paths at different time points, such that the projection beam PL is sequentially projected to different positions on the screen to form an image. In this way, a resolution of the image projected by the projection system 100 may be higher than a resolution of the image signal, so as to provide a better visual effect for the audience.

In the embodiment, the illumination module 110, for example, includes one or a plurality of Light-Emitting Diodes (LEDs). The light valve 120 is, for example, a Digital Micro-mirror Device (DMD) or a Liquid-Crystal-On-Silicon (LCOS) panel. However, in other embodiments, the light valve 120 may also be a transparent liquid crystal panel or another spatial light modulator, which is not limited by the invention. The optical relay unit 132 is, for example, a lens, a glass piece, a reflector, etc. The actuator 134 is, for example, an electromagnetic induction device, a voice coil motor, piezoelectric ceramic, a DC motor, an ultrasonic motor, a stepping motor or an electrostatic induction brake device, etc. Implementations of the optical relay unit 132 and the actuator 134 are not limited by the invention.

In FIG. 2, the optical relay unit 132 is, for example, a transparent glass piece, and the actuator 134 is, for example, an electromagnetic induction device. The actuator 134 includes a frame F, rotating shafts RA, and coils MR1-MR4. The rotating shaft R1 and the coils MR1-MR4 are mounted on the frame F, wherein the coil MR1 and the coil MR2 are winded around the rotating shaft RA in an X direction, and receive the driving current Id1, and the coil MR3 and the coil MR4 are winded around the rotating shaft RA in a Y direction, and receive the driving current Id2. When the coils MR1-MR4 receive the driving current Id1 or the driving current Id2, the coils MR1-MR4 are oscillated due to electromagnetic induction, so as to drive the frame F to swing, and oscillation amplitude of the coils MR1-MR4 is determined according to a current magnitude.

The optical relay unit 132 is disposed in the frame F of the actuator 134, and is pivotally connected to the frame F. When the coils MR1-MR4 have oscillated, the optical relay unit 132 is adapted to respectively rotate or move relative to the frame F along the rotating shaft R1 in the X direction and the Y direction, so that the image beam IL changes a direction after passing through the optical relay unit 132.

Particularly, the optical relay unit 132 is respectively rotated or moved in the X direction and the Y direction according to the driving current Id1 and the driving current Id2, where the driving current Id1 and the driving current Id2 may be the same or different, which is not limited by the invention. Therefore, the driving current Id of the specification includes the driving current Id1 related to the X direction and the driving current Id2 related to the Y direction.

Figure 3:
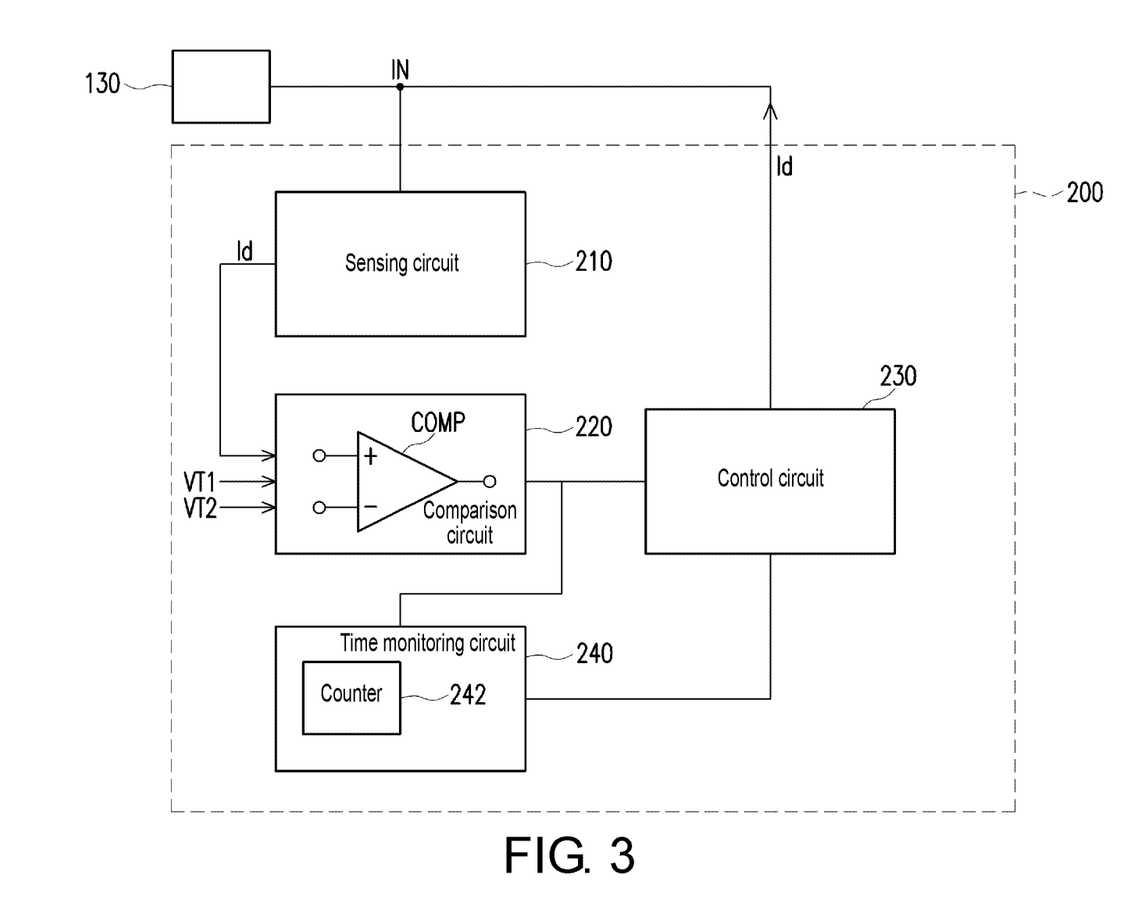
FIG. 3 is a block schematic diagram of a protection circuit according to an embodiment of the invention.
Figure 4:
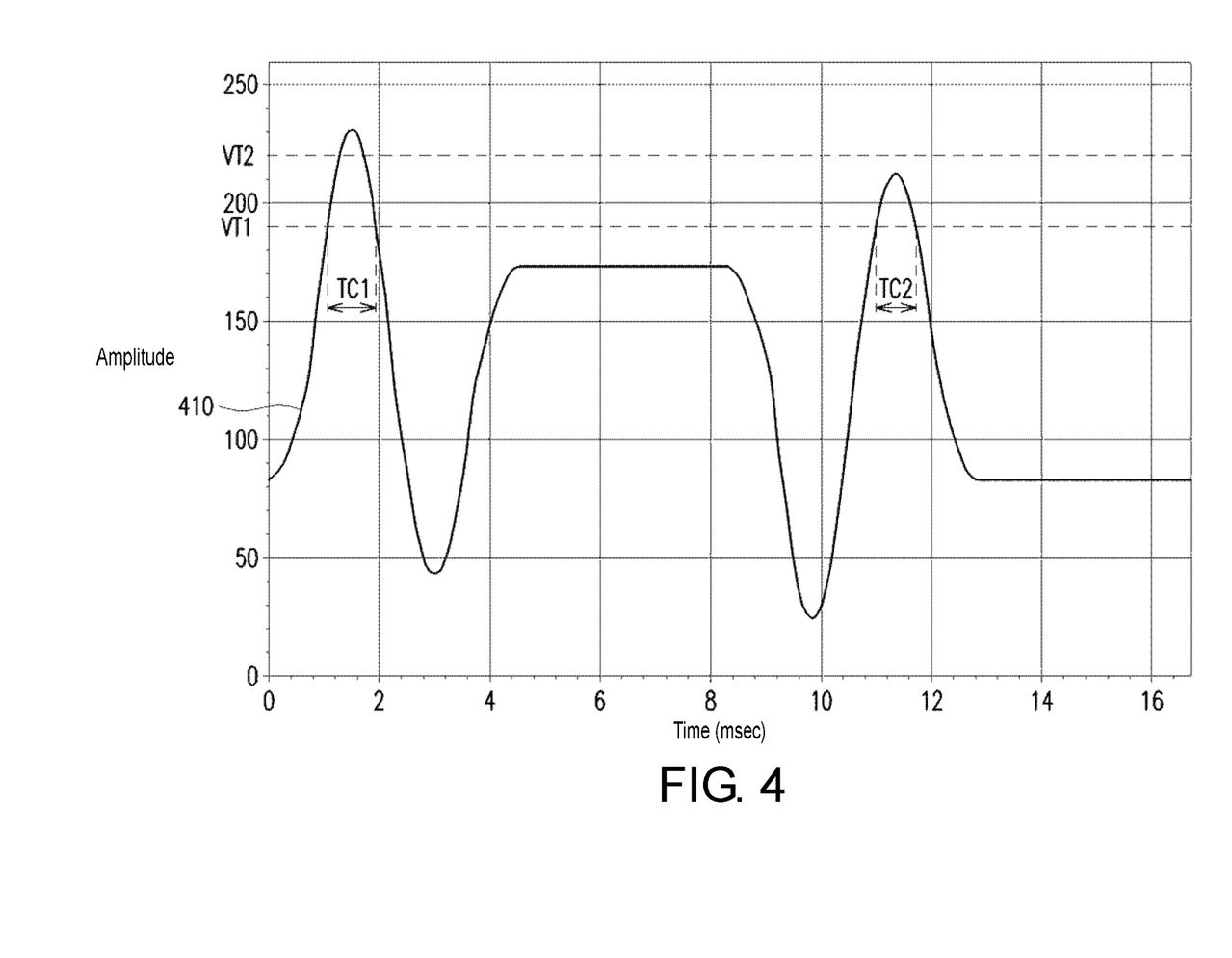
FIG. 4 is a waveform diagram of a driving current according to an embodiment of the invention.

FIG. 3 is a block schematic diagram of a protection circuit according to an embodiment of the invention. FIG. 4 is a waveform diagram of a driving current according to an embodiment of the invention. The protection circuit 200 of FIG. 3 is adapted to the protection circuit 140 of FIG. 1. The protection circuit 200 includes a sensing circuit 210, a comparison circuit 220, a control circuit 230 and a time monitoring circuit 240. In FIG. 4, a curve 410 represents the magnitude variation of the driving current Id in time. A second current threshold VT2 is greater than a first current threshold VT1.

The sensing circuit 210 is electrically connected to an input terminal IN of the image resolution enhancement device 130, and is configured to monitor the driving current Id at the input terminal IN. The comparison circuit 220 is electrically connected to the sensing circuit 210, and is configured to compare the driving current Id with the first current threshold VT1 and the second current threshold VT2 to output a comparison result. The comparison circuit 220, for example, includes one or a plurality of comparators COMP (only one comparator COMP is illustrated in FIG. 3 as a representative) configured to compare the driving current Id with the first current threshold VT1 and the second current threshold VT2, and an output terminal of the comparator COMP is coupled to an output terminal of the comparison circuit 220.

The time monitoring circuit 240 is electrically connected to the output terminal of the comparison circuit 220, and monitors the comparison result of the comparison circuit 220. The time monitoring circuit 240 includes a counter 242. When the comparison result represents that the driving current Id is greater than or equal to the first current threshold VT1 but smaller than the second current threshold VT2, the counter 242 of the time monitoring circuit 240 starts counting a duration time, and the time monitoring circuit 240 keeps determining whether the duration time is greater than or equal to a time threshold Tth.

The control circuit 230 is electrically connected to the comparison circuit 220 and the time monitoring circuit 240. The control circuit 230 adjusts the driving current Id to control the image resolution enhancement device 130 according to the comparison result from the comparison circuit 220 and an output result of the time monitoring circuit 240.

Particularly, a current value of the driving current Id input to the image resolution enhancement device 130 is generally not a constant value or a linear value and is probably varied in time. The variation of the driving current Id in time is not necessarily periodic, and a variation in amplitude is probably not fixed, as shown by the curve 410 of FIG. 4. Therefore, the time threshold Tth is determined according to a waveform of the driving current Id. To be specific, the projection system 100 may pre-determine the time threshold Tth or the first current threshold VT1 according to the waveform of the driving current Id before the driving current Id is input to the image resolution enhancement device 130.

An embodiment is provided below to describe how the control circuit 230 controls the image resolution enhancement device 130 according to the driving current Id.

Figure 5:
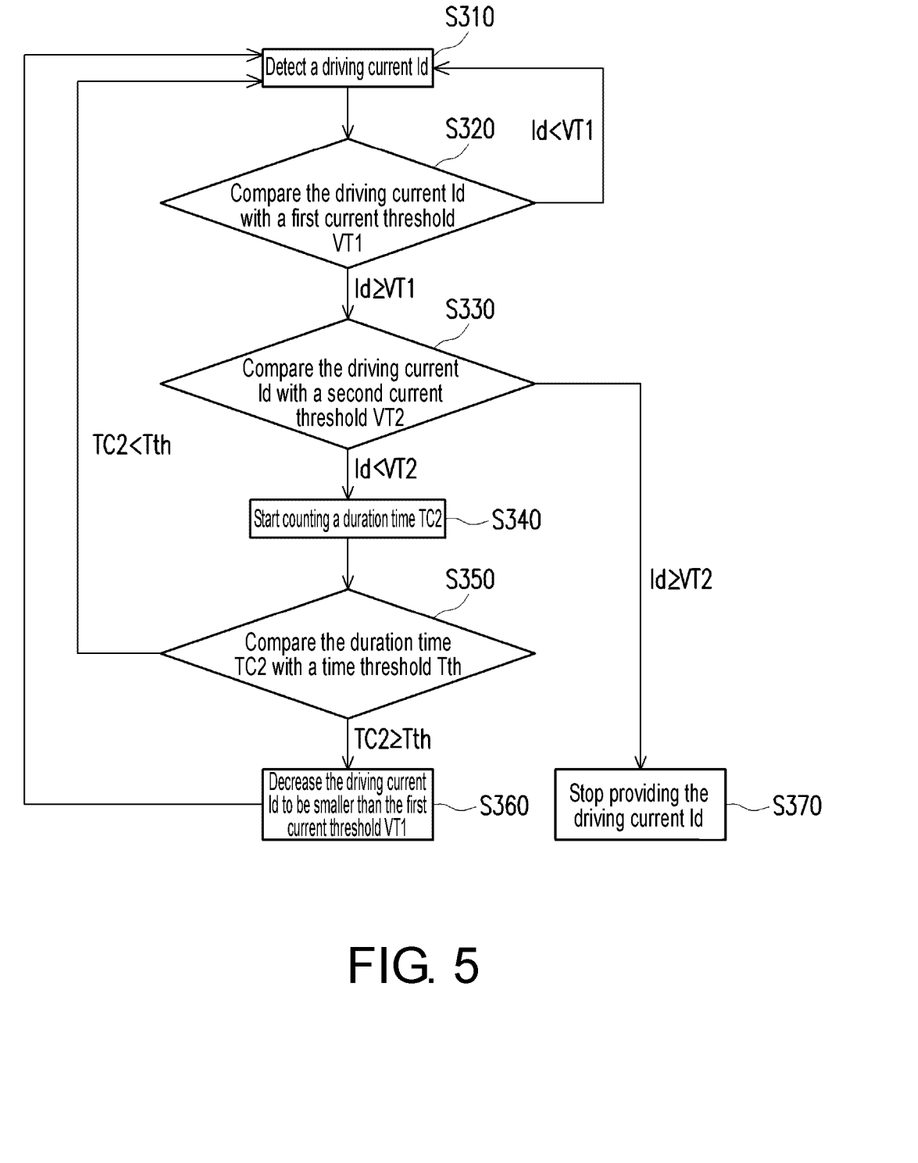
FIG. 5 is a flowchart illustrating a current monitoring method of an image resolution enhancement device according to an embodiment of the invention.

FIG. 5 is a flowchart illustrating a current monitoring method of an image resolution enhancement device according to an embodiment of the invention. The current monitoring method of the image resolution enhancement device of FIG. 5 is adapted to the embodiments of FIG. 1 to FIG. 4, steps of the current monitoring method are described below with reference to the components in FIG. 1 to FIG. 4.

To be specific, in step S310, the sensing circuit 210 detects the driving current Id to be input to the image resolution enhancement device 130, and provides a detection result to the comparison circuit 220. In step S320, the comparison circuit 220 compares the driving current Id with the first current threshold VT1, and when a comparison result of the comparison circuit 220 represents that the driving current Id is greater than or equal to the first current threshold VT1, a step S330 is executed. When the comparison result of the comparison circuit 220 represents that the driving current Id is smaller than the first current threshold VT1, the flow returns to the step S310.

In the step S330, the comparison circuit 220 further compares the driving current Id with a second current threshold VT2, wherein the second current threshold VT2 is greater than the first current threshold VT1. When the driving current Id is greater than or equal to the second current threshold VT2, a step S370 is executed, by which the comparison circuit 220 notifies the control circuit 230 to adjust the driving current Id to stop the image resolution enhancement device 130. For example, the control circuit 230 stops providing the driving current Id to the image resolution enhancement device 130, i.e., the driving current Id received by the image resolution enhancement device 130 is decreased to 0.

When the driving current Id is greater than or equal to the first current threshold VT1 but smaller than the second current threshold VT2, a step S340 is executed. In the step S340, the time monitoring circuit 240 starts counting, and the time monitoring circuit 240 stops counting till the driving current Id is again smaller than the first current threshold VT1, and the counted time is referred to as a duration time, shown as the duration time TC2 in FIG. 4.

It should be noted that in a time interval TC1, the driving current Id is gradually increased to exceed the second current threshold VT2, so that during the process of continuously monitoring the driving current Id, the driving current Id may be determined to be greater than or equal to the second current threshold VT2 in the step S330, and the step S370 is executed without executing a step S350, and the time monitoring circuit 240 may stop counting and the control circuit 230 may stop the image resolution enhancement device 130.

In step S350, the comparison circuit 220 further compares the duration time TC2 with the time threshold Tth. During the duration time TC2, when the driving current Id is greater than the first current threshold VT1 but is always smaller than the second current threshold VT2, and the duration time TC2 does not exceed the time threshold Tth, the control circuit 230 maintains the magnitude of the driving current Id, and the flow returns to the step S310.

However, when the duration time TC2 exceeds the time threshold Tth, a step S360 is executed, by which the control circuit 230 decreases the driving current Id to control the image resolution enhancement device 130 to prevent image resolution enhancement device 130 from overheating or causing component damage, and then the flow returns to the step S310. For example, the control circuit 230 may select to decrease the driving current Id (but the driving current Id is not decreased to 0) to control the image resolution enhancement device 130 (for example, to decrease the driving current Id to be smaller than the first current threshold VT1 to return to the step S310).

In summary, the embodiments of the invention have at least one of the following advantages or effects. The projection system of the embodiments of the invention has the protection circuit of the image resolution enhancement device. The protection circuit and the current monitoring method of the image resolution enhancement device is capable of protecting the image resolution enhancement device in the projection system, so as to avoid the problem of component damage caused by the excessively large driving current of the image resolution enhancement device. During the projection process of the projection system, the driving current is continuously monitored to maintain the stableness of the projection system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
   an illumination module, configured to emit an illumination beam;
   a light valve, disposed on a transmission path of the illumination beam, and configured to convert the illumination beam into an image beam;
   an image resolution enhancement device, disposed on a transmission path of the image beam, and configured to change the transmission path of the image beam according to a driving current provided to the image resolution enhancement device, wherein the image resolution enhancement device comprises a transparent glass piece, and the light valve is physically separated from the image resolution enhancement device;
   a protection circuit, electrically connected to the image resolution enhancement device, and configured to detect the driving current, wherein when the driving current is greater than or equal to a first current threshold, the protection circuit further compares the driving current with a second current threshold, wherein the second current threshold is greater than the first current threshold,
   wherein when a duration time that the driving current is smaller than the second current threshold but greater than or equal to the first current threshold is greater than or equal to a time threshold, the protection circuit decreases the driving current to be smaller than the first current threshold to control the image resolution enhancement device; and
   a projection lens, disposed on the transmission path of the image beam, and configured to convert the image beam into a projection beam, wherein the image resolution enhancement device is configured to receive the image beam transmitted from the light valve and to allow the image beam to penetrate the transparent glass piece to the projection lens.

2. The projection system as claimed in claim 1, wherein the protection circuit comprises:
   a sensing circuit, electrically connected to an input terminal of the image resolution enhancement device, and configured to monitor the driving current at the input terminal;
   a comparison circuit, electrically connected to the sensing circuit, and configured to compare the driving current with the first current threshold and the second current threshold to output a comparison result;
   a time monitoring circuit, electrically connected to an output terminal of the comparison circuit, wherein when the driving current is greater than or equal to the first current threshold but smaller than the second current threshold, the time monitoring circuit is configured to start counting the duration time, and keep determining whether the duration time is greater than the time threshold; and
   a control circuit, electrically connected to the comparison circuit and the time monitoring circuit, and configured to adjust the driving current to control the image resolution enhancement device according to the comparison result and an output result of the time monitoring circuit.

3. The projection system as claimed in claim 1, wherein the time threshold is determined according to a waveform of the driving current.

4. The projection system as claimed in claim 1, wherein when the driving current is greater than or equal to the second current threshold, the protection circuit stops providing the driving current to the image resolution enhancement device.

5. The projection system as claimed in claim 1, wherein when the driving current is greater than or equal to the first current threshold but smaller than the second current threshold, and the duration time does not exceed the time threshold, the driving current is unchanged.

6. A protection circuit of an image resolution enhancement device, wherein the image resolution enhancement device receives a driving current to change a transmission path of an image beam, the image resolution enhancement device comprises a transparent glass piece, the image resolution enhancement device is configured to receive the image beam transmitted from a light valve and to allow the image beam to penetrate the transparent glass piece to a projection lens, and the light valve is physically separated from the image resolution enhancement device, the protection circuit comprising:

a sensing circuit, electrically connected to an input terminal of the image resolution enhancement device, and configured to monitor the driving current at the input terminal;

a comparison circuit, electrically connected to the sensing circuit, and configured to compare the driving current with a first current threshold and a second current threshold to output a comparison result, wherein the second current threshold is greater than the first current threshold;

a time monitoring circuit, electrically connected to an output terminal of the comparison circuit, configured to start counting a duration time when the driving current is greater than or equal to the first current threshold but smaller than the second current threshold, and keep determining whether the duration time is greater than or equal to a time threshold; and     a control circuit, electrically connected to the comparison circuit and the time monitoring circuit, and configured to adjust the driving current to control the image resolution enhancement device according to the comparison result and an output result of the time monitoring circuit.

7. The protection circuit of the image resolution enhancement device as claimed in claim 6, wherein     when the driving current is greater than or equal to the second current threshold, the protection circuit stops providing the driving current to the image resolution enhancement device, and     when the driving current is smaller than the second current threshold but greater than or equal to the first current threshold, and the duration time is greater than or equal to the time threshold, the protection circuit decreases the driving current to be smaller than the first current threshold to control the image resolution enhancement device.

8. A current monitoring method of an image resolution enhancement device, wherein the image resolution enhancement device receives a driving current to change a transmission path of an image beam, the image resolution enhancement device comprises a transparent glass piece, the image resolution enhancement device is configured to receive the image beam transmitted from a light valve and to allow the image beam to penetrate the transparent glass piece to a projection lens, and the light valve is physically separated from the image resolution enhancement device, the current monitoring method comprising:

monitoring the driving current;

comparing the driving current with a first current threshold;

further comparing the driving current with a second current threshold when the driving current is greater than or equal to the first current threshold, wherein the second current threshold is greater than the first current threshold;

starting counting a duration time when the driving current is greater than or equal to the first current threshold but smaller than the second current threshold; and     decreasing the driving current to be smaller than the first current threshold to control the image resolution enhancement device when the duration time is greater than or equal to a time threshold.

9. The current monitoring method of the image resolution enhancement device as claimed in claim 8, wherein the time threshold is determined according to a waveform of the driving current.

10. The current monitoring method of the image resolution enhancement device as claimed in claim 8, further comprising:

stopping providing the driving current to the image resolution enhancement device when the driving current is greater than or equal to the second current threshold.

11. The current monitoring method of the image resolution enhancement device as claimed in claim 8, wherein when the driving current is greater than or equal to the first current threshold but smaller than the second current threshold, and the duration time does not exceed the time threshold, the driving current is unchanged.

\* \* \* \* \*